United States Patent
Chen et al.

(10) Patent No.: US 12,280,510 B2
(45) Date of Patent: Apr. 22, 2025

(54) BIPED ROBOT CONTROL METHOD AND BIPED ROBOT USING THE SAME AND COMPUTER READABLE STORAGE MEDIUM

(71) Applicant: UBTECH ROBOTICS CORP LTD, Shenzhen (CN)

(72) Inventors: Chunyu Chen, Shenzhen (CN); Youjun Xiong, Shenzhen (CN); Yizhang Liu, Shenzhen (CN); Qiuyue Luo, Shenzhen (CN); Ligang Ge, Shenzhen (CN); Jie Bai, Shenzhen (CN); Jiangchen Zhou, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 395 days.

(21) Appl. No.: 17/678,037

(22) Filed: Feb. 23, 2022

(65) Prior Publication Data

US 2022/0379480 A1 Dec. 1, 2022

Related U.S. Application Data

(63) Continuation of application No. PCT/CN2021/126709, filed on Oct. 27, 2021.

(30) Foreign Application Priority Data

May 27, 2021 (CN) .......................... 202110584040.5

(51) Int. Cl.
*B62D 57/00* (2006.01)
*B25J 9/16* (2006.01)
*B62D 57/032* (2006.01)

(52) U.S. Cl.
CPC .......... *B25J 9/1682* (2013.01); *B25J 9/1651* (2013.01); *B25J 9/1664* (2013.01); *B62D 57/032* (2013.01)

(58) Field of Classification Search
CPC ...... B25J 9/1682; B25J 9/1651; B25J 9/1664; B25J 9/163; B62D 57/032
See application file for complete search history.

(56) References Cited

U.S. PATENT DOCUMENTS 9,586,316 B1 * 3/2017 Swilling ................. B25J 9/1664
10,081,098 B1 * 9/2018 Nelson ..................... B25J 19/02
(Continued)

FOREIGN PATENT DOCUMENTS

| CN | 110286679 A | * | 9/2019 | |
| CN | 112731952 A | * | 4/2021 | ............ B25J 9/1602 |

(Continued)

OTHER PUBLICATIONS

E. Dong, D. Wang, C. Chen and J. Tong, "Realization of biped robot gait planning based on NAO robot development platform," 2016 IEEE International Conference on Mechatronics and Automation, Harbin, China, 2016, pp. 1073-1077 (Year: 2016).*
D. Pratama, E. H. Binugroho and F. Ardilla, "Movement control of two wheels balancing robot using cascaded PID controller," 2015 International Electronics Symposium (IES), Surabaya, Indonesia, 2015, pp. 94-99 (Year: 2015).*
CN110286679A_LinearInvertedPendulumModelBasedRobotGaitPlanning Method_Drawings (Year: 2019).*

(Continued)

*Primary Examiner* — Ramon A. Mercado
*Assistant Examiner* — Shaheda Hoque

(57) ABSTRACT

A biped robot control methods and a biped robot using the same as well as a computer readable storage medium are provided. The method includes: obtaining an initial distance between a centroid of a double inverted pendulum model of the biped robot and a support point of the biped robot, an initial moving speed of the centroid and an initial displacement of the centroid; calculating a measured value of a stable point of the doable inverted pendulum model based on the initial distance and the initial moving speed; calculating a control output quantity based on the initial moving speed and the measured value of the stable point; calculating a desired displacement of the centroid of the double-inverted (Continued)

pendulum model based on the initial moving speed, the initial displacement, and the control output quantity; and controlling the biped robot to move laterally according to the desired displacement.

16 Claims, 5 Drawing Sheets

(56) References Cited

U.S. PATENT DOCUMENTS

| | | | |
|---|---|---|---|
| 2010/0114329 A1* | 5/2010 | Casler | B62D 57/032 623/24 |
| 2016/0236349 A1* | 8/2016 | Yamane | B25J 9/1664 |
| 2021/0178587 A1* | 6/2021 | Chen | B62D 57/032 |
| 2021/0178588 A1* | 6/2021 | Chen | B25J 13/088 |
| 2022/0040857 A1* | 2/2022 | Xie | B25J 9/1664 |
| 2023/0415333 A1 | 12/2023 | Ge et al. | |

FOREIGN PATENT DOCUMENTS

| | | | | |
|---|---|---|---|---|
| CN | 112731953 A | * | 4/2021 | B25J 9/1602 |
| CN | 112792807 A | * | 5/2021 | B25J 9/1602 |
| WO | WO-2017092463 A1 | * | 6/2017 | B25J 5/00 |

OTHER PUBLICATIONS

F. Wang, S. Zhao, J. Xu and Y. Liu, "An on-line gait synthesis strategy for biped robot with Capture Points combining with RNS," Proceeding of the 11th World Congress on Intelligent Control and Automation, Shenyang, China, 2014, pp. 980-984 (Year: 2014).*
ISR for PCT/CN2021/126709.
Written opinions of ISA for PCT/CN2021/126709.

* cited by examiner

BIPED ROBOT CONTROL METHOD AND BIPED ROBOT USING THE SAME AND COMPUTER READABLE STORAGE MEDIUM

CROSS REFERENCE TO RELATED APPLICATIONS

The present disclosure is a continuation-application of International Application PCT/CN2021/126709, with an international filing date of Oct. 27, 2021, which claims foreign priority of Chinese Patent Application No. 202110584040.5, filed on May 27, 2021 in the State Intellectual Property Office of China, the contents of all of which are hereby incorporated by reference.

BACKGROUND

1. Technical Field

The present disclosure relates to robot technology, and particularly to a biped robot control method and a biped robot using the same as well as a computer readable storage medium.

2. Description of Related Art

With the continuous development of robot technology, various types of robots such as service robots, entertainment robots, industrial robots, and agricultural robots emerge in endlessly, and bring great convenience to people's daily life. Biped robots are a type of bionic robot that are capable of performing bipedal walking and related actions. However, when a biped robot is stepping or walking, it is easily disturbed by the external environment or human factors which cause its centroid (i.e., center of mass) to deviate to one side and lead to poor stability.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
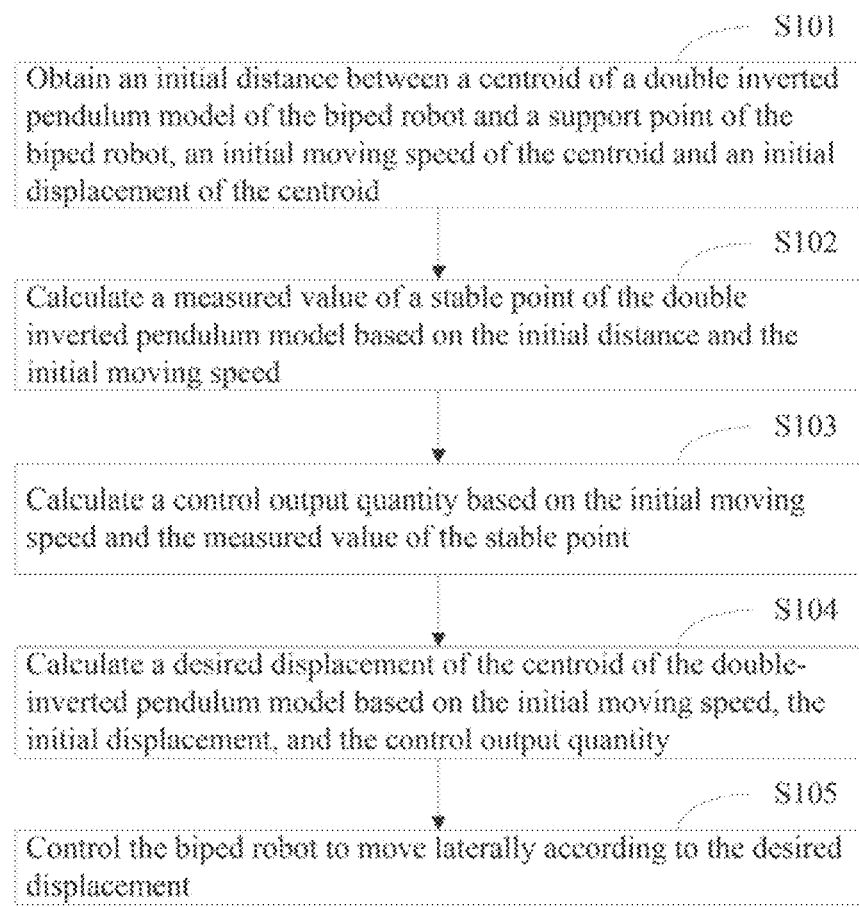
FIG. 1 is a flow chart of a biped robot control method according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the term "and/or" used in the description and the appended claims of the present disclosure refers to any combination of one or more of the associated listed items and all possible combinations, and includes such combinations.

As used in the description and the appended claims, the term "if" may interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the description and the claims of the present disclosure, the terms "first", "second", "third", and the like in the descriptions are only used for distinguishing, and cannot be understood as indicating or implying relative importance.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in some other embodiments", "in other embodiments" and the like that appear in different places of the specification do not mean that descripted embodiments should be referred by all other embodiments, but instead be referred by "one or more but not all other embodiments" unless otherwise specifically emphasized. The terms "including", "comprising", "having" and their variations all mean "including but not limited to" unless otherwise specifically emphasized.

The embodiments of the present disclosure provide a biped robot control method which may be executed by processor(s) of a biped robot when executing a corresponding computer program. By adopting the control method for a stable point of the biped robot based on a double inverted pendulum model, the stability and adaptability of the lateral movement of the biped robot when it is disturbed by the external environment or human factors can be effectively improved, thereby realizing the stable control of the lateral movement of the biped robot, and improving the anti-interference capability of the biped robot.

In actual applications, the biped robot may be any type of biped robot with walking function. There are various types of biped robots with walking function among service robots, entertainment robots, industrial robots, agricultural robots and the like, for example, bionic educational robots, bionic welcome robots, bionic dancing robots, and bionic nanny robots.

FIG. 1 is a flow chart of a biped robot control method according to an embodiment of the present disclosure. In this embodiment, the biped robot control method is a computer-implemented method executable for a processor of a biped robot. The biped robot has two legs, that is, a left leg and a right leg. The method may be implemented through a biped robot control apparatus shown in FIG. 4 or a biped robot shown in FIG. 5. As shown in FIG. 1, the method may include the following steps.

S101: obtaining an initial distance between a centroid of a double inverted pendulum model of the biped robot and a support point of the biped robot, an initial moving speed of the centroid and an initial displacement of the centroid.

In actual applications, when the biped robot moves laterally, it may be simplified as one double inverted pendulum model.

Figure 2:
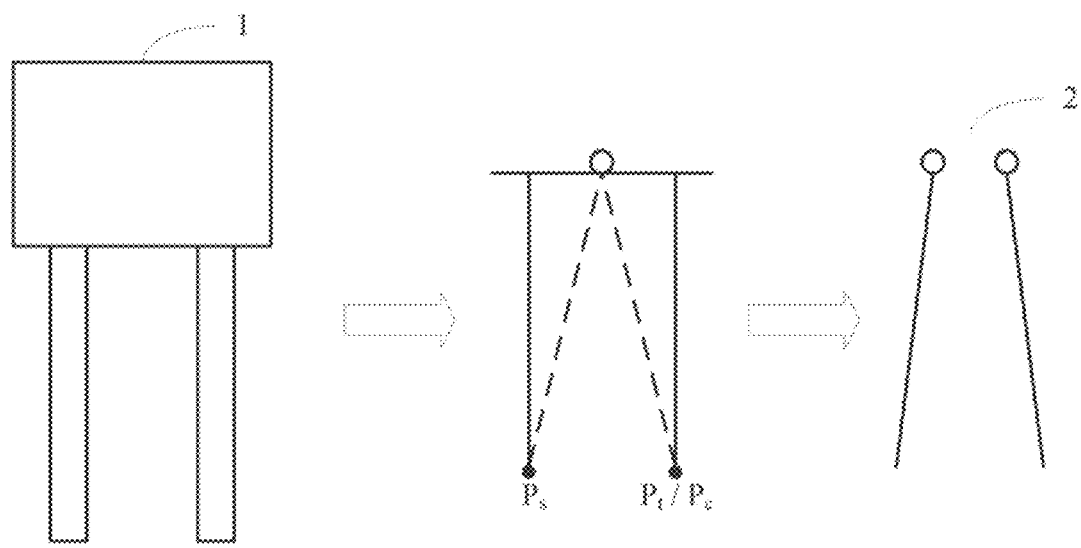
FIG. 2 is a schematic block diagram of simplifying a biped robot into a double inverted pendulum model according to an embodiment of the present disclosure.

FIG. 2 is a schematic block diagram of simplifying the biped robot into the double inverted pendulum model according to an embodiment of the present disclosure. As shown in FIG. 2, a process of simplifying a biped robot 1 into a double inverted pendulum model 2 is shown.

In actual applications, the double inverted pendulum model may be used to describe whether the biped robot is in the stable state when it moves laterally. According to the double inverted pendulum model, in order to accurately describe that the biped robot is in a stable state and is constant when its particles are moving, it is necessary to construct the concept of a stable point $P_t$ of the double inverted pendulum model. In the double inverted pendulum model, a capture point $P_c$ is defined, which is used to describe the state of a single inverted pendulum model so as to determine whether the inverted pendulum model is in the stable state. The capture point $P_c$ may be calculated using an equation of:

$$\xi = x + \frac{\dot{x}}{w}; \quad \text{(Equation 1)}$$

where, $\xi$ represents the capture point $P_c$, x represents the distance between the centroid and the support point $P_s$ of the inverted pendulum model, $\dot{x}$ represents the moving speed of the centroid, and w represents the natural frequency of the inverted pendulum model.

In actual applications, in the definition of the capture point $P_c$, the inverted pendulum model is in the stable state when $\dot{x}=0$, $x=0$. The lateral motion of the biped robot may be expressed as a reciprocating cyclic motion. Therefore, based on the concept of the capture point $P_c$, a constant for describing the state of the biped robot when it moves laterally (i.e., the expected value of the stable point $P_t$ of the inverted pendulum model) may be designed, and then the inverted pendulum model may be made to be in the stable state by reasonably designing the position of the support point $P_s$ of the biped robot such that the capture point $P_c$ (i.e., the stable point $P_t$ of the inverted pendulum model) is zero. The support point $P_s$ and the stable point $P_t$/the capture point $P_c$ are relative with each other, that is, when one point is the support point $P_s$, the other point will be the stable point $P_t$/the capture point $P_c$.

In actual applications, the double inverted pendulum model may include two inverted pendulum models that correspond to the left and right legs of the biped robot respectively, and the capture point of each inverted pendulum model in the double inverted pendulum model may be calculated using the forgoing Equation 1. When the biped robot is supported by the left leg (i.e., the center of gravity of the biped robot is on the left leg), the capture point is calculated using the distance between the centroid of the left leg and the support point of the double inverted pendulum model and the moving speed of the centroid of the left leg; and when the biped robot is supported by the right leg (i.e., the center of gravity of the biped robot is on the right leg), the capture point is calculated using the distance between the centroid of the right leg and the support point of the double inverted pendulum model and the moving speed of the centroid of the right leg.

In actual applications, when the biped robot starts to move laterally under the control of the user, it needs to obtain the initial distance between the centroid and the support point of the equivalent double inverted pendulum model according to the actual lateral movement of the biped robot (the initial distance between the centroid of the left leg of the double inverted pendulum model and the support point is obtained when the biped robot is supported by the left leg; and the initial distance between the centroid of the right leg of the double inverted pendulum model and the support point is obtained when the biped robot is supported by the right leg), the initial moving speed, and the initial displacement. When the biped robot starts to move laterally under the control of the user from a stationary state, the initial distance between the centroid and the support point of the double inverted pendulum model, the initial moving speed and the initial displacement are the distance between the centroid and the support point, the moving speed and the displacement in the stationary state, respectively. In which, the moving speed and the displacement in the stationary state are 0. With respect the K+1-th moment, the distance between the centroid of the double inverted pendulum model and the support point, the moving speed and the displacement at the K-th moment are the initial distance, the initial speed and the initial displacement respectively, where K is any positive integer, the K-th moment may be the current moment, and the K+1-th moment may be the next moment.

In actual applications, the user of the biped robot may input a movement control command through a human-computer interaction device of the biped robot so as to directly control the biped robot to move laterally according to the movement control command; or the user may control a user terminal to send the movement control command to the bipedal robot through a human-computer interaction device of the user terminal so as to indirectly control the biped robot to move laterally according to the movement control command, where the user terminal can communicate with the bipedal robot.

In actual applications, the human-computer interaction device of the biped robot may include at least one of a physical button, a touch sensor, a gesture recognition sensor and a voice recognition unit, so that the user can input the movement control command through the corresponding touch method, gesture control method or voice control method. The physical button and the touch sensor may be disposed anywhere on the biped robot, for example, on the control panel. The touch method for the physical button may be pressing or toggling. The touch method for the touch sensor may be pressing or touching. The gesture recognition sensor may be disposed at any position outside the casing of the biped robot. The gestures for controlling the biped robot may be customized by the user according to actual needs, or the factory default settings may be used. The speech recognition unit may include a microphone and a speech recognition chip, or may only include the microphone and a speech recognition function may be implemented by the processor of the biped robot. The voice for controlling the biped robot may be customized by the user according to actual needs, or the factory default settings may be used.

In actual applications, the user terminal may be a computing device with wireless or wired communication functions for communicating with the biped robot, for example, a remote control, a mobile phone, a smart bracelet, a tablet computer, a notebook computer, an internet netbook, a personal digital assistant (PDA), a computer, or a server. In this embodiment, the type of the user terminal is not limited. The human-computer interaction device of the user terminal may be the same as that of the biped robot, which will not be repeated herein.

S102: calculating a measured value of the stable point of the double inverted pendulum model based on the initial distance and the initial moving speed.

In actual applications, the actual stable point of the biped robot will change with the changes of the distance between the centroid and the support point and the moving speed during the movement. Therefore, to control the lateral movement of the biped robot at the next moment to be in the stable state, it needs to calculate the actual stable point (i.e., the measured value of the stable point) at the current moment based on the distance between the centroid of the biped robot and the support point and the moving speed (i.e., the initial moving speed) at the current moment, then a control output quantity for controlling the displacement of the biped robot is adjusted in a feedback manner according to the actual stable point, and then the displacement that enables the stable lateral movement of the biped robot at the next moment (i.e., the desired displacement) is calculated according to the control output quantity.

In one embodiment, step S102 may include:
calculating the measured value of the stable point of the double-inverted pendulum model based on the initial distance, the initial moving speed, a natural frequency of the double-inverted pendulum model, and an expect value of the stable point of the double-inverted pendulum model.

In actual applications, the expected value of the stable point of the double inverted pendulum model is a constant set by the user according to actual needs. In theory, when the biped robot is in the stable state, the measured value of the stable point should be equal to the expected value of the stable point. However, during the actual lateral movement, the stable point will change with the changes of the distance between the centroid and the support point and the moving speed. Therefore, the measured value of the stable point will not be necessarily equal to the expected value, and the measured value of the stable point needs to be recalculated according to the actual distance between the centroid and the support point, the moving speed, and the expected value of the stable point.

In one embodiment, the measured value of the stable point of the double-inverted pendulum model may be calculated using equations of:

$$\rho_m = \begin{cases} x_l + \dfrac{|\dot{x}_l|}{w} + \rho_d, \text{ during left leg supporting} \\ x_r + \dfrac{|\dot{x}_r|}{w} + \rho_d, \text{ during right leg supporting} \end{cases} ; \quad \text{(Equation 2)}$$

where, $\rho_m$ represents the measured value of the stable point, $x_l$ represents an initial distance between a centroid of a left leg of the double-inversion model and the support point, $\dot{x}_l$ represents a moving speed of the centroid of the left leg of the double inverted pendulum. $x_r$ represents an initial distance between a centroid of a right leg of the double inverted model and the support point, $\dot{x}_r$ represents a moving speed of the centroid of the right leg of the double inverted model, w represents the natural frequency of the double inverted pendulum model, each of $\dot{x}_l$ and $\dot{x}_r$ is the initial moving speed, and pa represents the expected value of the stable point.

Figure 3:
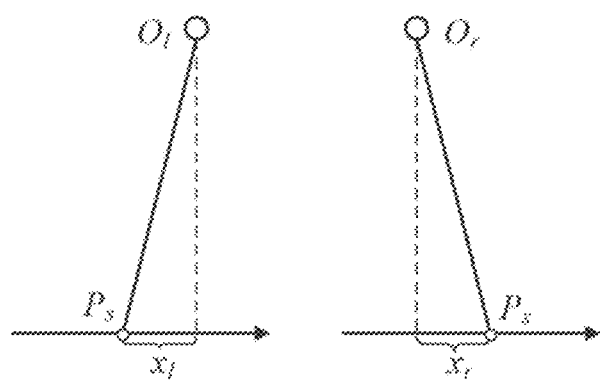
FIG. 3 is a schematic block diagram of the parameters of the double inverted pendulum model according to an embodiment of the present disclosure.

FIG. 3 is a schematic block diagram of the parameters of the double inverted pendulum model according to an embodiment of the present disclosure. As shown in FIG. 3, the initial distance $x_l$ between the centroid $O_l$ of the left leg of the double inverted pendulum model and the support point $P_s$ and the distance $x_r$ between the centroid $O_r$ of the right leg of the double inverted pendulum model and the support point $P_s$ are shown, where the direction of the arrow is the lateral movement direction of the biped robot.

S103: calculating a control output quantity based on the initial moving speed and the measured value of the stable point.

In actual applications, on the basis of the basic idea of the proportional integral differential (PID) control method, the control output quantity for performing the lateral movement control on the biped robot may be adjusted in a feedback manner according to the initial moving speed of the double inverted pendulum model of the biped robot and the measured value of the stable point, thereby adjusting the initial moving speed according to the control output quantity, and then the initial displacement is adjusted according to the adjusted initial moving speed. The control output may be acceleration.

In one embodiment, step S103 may include:
calculating the control output quantity based on a control proportional coefficient, an expected value of the stable point, the measured value of the stable point, a control differential coefficient and the initial moving speed.

In actual applications, the control proportional coefficient, the expected value of the stable point and the control differential coefficient are all known parameters set by the user in advance according to the actual needs. The control output is related to the control proportional coefficient, the expected value of the stable point, the measured value of the stable point, the control differential coefficient and the expected value of the moving speed (i.e., the expected moving speed that the biped robot can achieve after adjusting the control output). The expected value of the moving speed is related to the initial moving speed and the control output quantity.

In one embodiment, the control output quantity may be calculated using equations of:

$$a = k_p(\rho_d - \rho_m) + k_d(0-v); \text{ and}$$

$$v = v_0 + a*t;$$

where, a represents the control output quantity, $k_p$ represents the control proportional coefficient, $\rho_d$ represents the expected value of the stable point, $\rho_m$ represents the measured value of the stable point, $k_d$ represents the control differential coefficient, v represents a desired value of the moving speed of the centroid of the double inverted pendulum, $v_0$ represents the initial moving speed, and t represents the time constant.

In actual applications, the time constant may be equal to the time difference between the current moment and the next moment. Based on the measured value of the stable point and the initial moving speed that are obtained at the current moment, and combining with the known parameters of the control proportional coefficient, the expected value of the stable point and the control differential coefficient, the control output quantity for controlling the stable lateral movement of the biped robot at the next moment may be calculated.

S104: calculating a desired displacement of the centroid of the double-inverted pendulum model based on the initial moving speed, the initial displacement, and the control output quantity.

In actual applications, after the control output quantity for controlling the stable lateral movement of the biped robot at the next moment is obtained, the desired displacement for controlling the stable lateral movement of the biped robot at the next moment may be further calculated based on the control output quantity and the obtained initial moving speed and initial displacement at the current moment.

In one embodiment, the desired displacement of the centroid of the double-inverted pendulum model may be calculated using equations of:

$$p = p_0 + v*t + 0.5*t^2; \text{ and}$$

$$v = v_0 + a*t;$$

where, p represents the desired displacement, $p_0$ represents the initial displacement, v represents a desired value of the moving speed of the centroid of the double inverted model, $v_0$ represents the initial moving speed, t represents the time constant, and a represents the control output quantity.

S105: controlling the biped robot to move laterally according to the desired displacement.

In actual applications, after obtaining the desired displacement for controlling the stable lateral movement of the biped robot at the next moment, the joint angle(s) of the biped robot may be inversely solved by combining the desired displacement and a lateral movement trajectory equation of the centroid, so as to control the corresponding joint(s) of the biped robot to move at the joint angle(s) thereby realizing the lateral movement control of the biped robot.

In one embodiment, step S105 may include:
obtaining one or more joint angles of the biped robot based on the desired displacement and a lateral movement trajectory of the biped robot; and
controlling the biped robot to move laterally based on the one or more joint angles In the biped robot control method of this embodiment, by adopting the control method for the stable point of the biped robot based on a double inverted pendulum model, the stability and adaptability of the lateral movement of the biped robot when it is disturbed by the external environment or human factors can be effectively improved, thereby realizing the stable control of the lateral movement of the biped robot, and improving the anti-interference capability of the biped robot.

It should be understood that, the sequence of the serial number of the steps in the above-mentioned embodiments does not mean the execution order while the execution order of each process should be determined by its function and internal logic, which should not be taken as any limitation to the implementation process of the embodiments.

The embodiments of the present disclosure further provide a bipedal robot control apparatus, which is configured to execute the steps in the above-mentioned method embodiments. The apparatus may be a virtual appliance in the biped robot which is executed by the processor of the biped robot, or be the biped robot itself.

Figure 4:
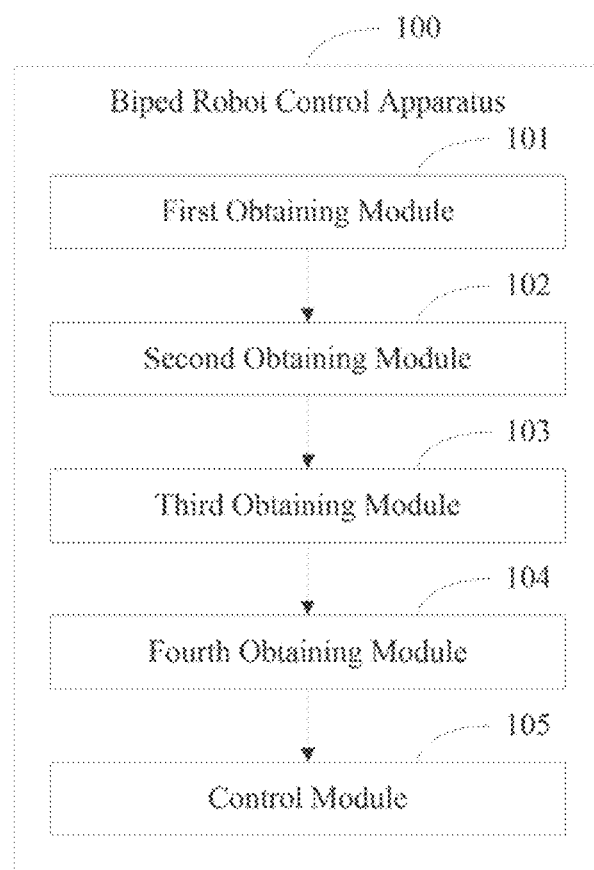
FIG. 4 is a schematic block diagram of a biped robot control apparatus according to an embodiment of the present disclosure.

FIG. 4 is a schematic block diagram of a biped robot control apparatus according to an embodiment of the present disclosure. As show FIG. 4, in this embodiment, a biped robot control apparatus 100 may include:

a first obtaining module 101 configured to obtain an initial distance between a centroid of a double inverted pendulum model of the biped robot and a support point of the double inverted pendulum model, an initial moving speed of the centroid and an initial displacement of the centroid;

a second obtaining module 102 configured to calculate a measured value of a stable point of the double inverted pendulum model based on the initial distance and the initial moving speed;

a third obtaining module 103 configured to calculate a control output quantity based on the initial moving speed and the measured value of the stable point;

a fourth obtaining module 104 configured to calculate a desired displacement of the centroid of the double-inverted pendulum model based on the initial moving speed, the initial displacement, and the control output quantity; and a control module 105 configured to control the biped robot to move laterally according to the desired displacement.

In actual applications, each of the modules in the above-mentioned apparatus may be a software module, or be implemented by different logic circuits integrated in the processor or independent physical components connected to the processor, or be implemented through a plurality of distributed processors.

Figure 5:
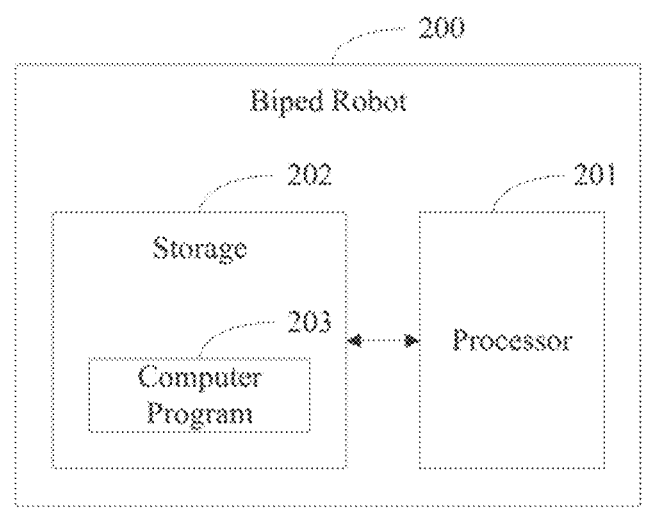
FIG. 5 is a schematic block diagram of a biped robot according to an embodiment of the present disclosure.

FIG. 5 is a schematic block diagram of a biped robot according to an embodiment of the present disclosure. As shown in FIG. 5, in this embodiment, a biped robot 200 is provided. The biped robot 200 includes at least one processor 201 (only one processor is shown in the figure), a storage 202, and a computer program 203 stored in the storage 202 and executable on the processor 201. When the processor 201 executes the computer program 203, the steps in each of the above-mentioned embodiments of the biped robot control method is implemented.

In actual applications, the biped robot may include a processor and a storage. The biped robot 200 of FIG. 5 is only an example of the biped robot and does not constitute a limitation to the biped robot, and more or less components than shown in the figure may be included, or certain components or different components may be combined. For example, it may further include motion parts, input and output devices, network access devices, and the like. The motion parts may include servos, motors, drivers and other devices for driving the joints of the robot to move. The input and output device may include the above-mentioned human-computer interaction device, and may also include a display screen for displaying the working parameters of the biped robot. The network access device may include a communication module for the biped robot to communicate with the user terminal.

In actual applications, the processor may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor. The processor may be a PID controller.

In actual application, the storage may be an internal storage unit of the biped robot, for example, a hard disk or a memory of the biped robot. In other embodiments, the storage may also be an external storage device of the biped robot, for example, a plug-in hard disk, a smart media card (SMC), a secure digital (SD) card, flash card, and the like, which is equipped on the biped robot. The storage may further include both an internal storage unit and an external storage device, of the biped robot. The storage is configured to store an operating system, application programs, a boot loader, data, and other programs such as codes of computer programs. The storage may also be used to temporarily store data that has been or will be output.

In actual application, the display screen may be a thin film transistor liquid crystal display (TFT-LCD), a liquid crystal display (LCD), an organic light-emitting diode (OLED display), a quantum dot light emitting diodes (QLED) display, seven-segment or eight-segment digital tube, or the like.

In actual application, the communication module may be set to any device that can directly or indirectly communicate with the client terminal over long distance wired or wireless communication according to actual needs. For example, the communication module may provide a communication solution apply to a network device such as wireless local area network (WLAN, e.g., Wi-Fi network), Bluetooth, Zigbee, mobile communication network, global navigation satellite system (GNSS), frequency modulation (FM), near field communication (NFC), and infrared (IR). The communication module may include an antenna, and the antenna may have only one array element, or may be an antenna array including a plurality of array elements. The communication module may receive electromagnetic waves through the antenna, frequency modulate and filter the electromagnetic wave signals, and send the processed signals to the processor. The communication module may also receive the signal to be sent from the processor to perform frequency modulation and amplification and then convert into electromagnetic waves for radiation through the antenna.

It should be noted that, the information exchange, execution process and others between the above-mentioned devices/modules are based on the same concept as the above-mentioned method embodiments. For the specific functions and technical effects, reference may be made to the method embodiments, and are not repeated herein.

Those skilled in the art may clearly understand that, for the convenience and simplicity of description, the division of the above-mentioned functional units or modules is merely an example for illustration. In actual applications, the above-mentioned functions may be allocated to be performed by different functional units or modules according to requirements, that is, the internal structure of the device may be divided into different functional units or modules to complete all or part of the above-mentioned functions. The functional units or modules in the embodiments may be integrated in one processing unit, or each unit or module may exist alone physically, or two or more units may be integrated in one unit or module. The above-mentioned integrated unit or modules may be implemented in the form of hardware or in the form of software functional unit or modules. In addition, the specific name of each functional unit or module is merely for the convenience of distinguishing each other and are not intended to limit the scope of protection of the present disclosure. For the specific operation process of the units or modules in the above-mentioned system, reference may be made to the corresponding processes in the above-mentioned method embodiments, and are not described herein.

The embodiments of the present disclosure further provide a computer-readable storage medium stored with a computer program. When the computer program is executed by a processor, the steps in the above-mentioned method embodiments can be implemented.

The embodiments of the present disclosure further provide a computer program product. The computer program product enables the biped robot to implement the steps in the above method embodiments when it is executed on the biped robot.

When the integrated module/unit is implemented in the form of a software functional module/unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may at least include any primitive or device capable of carrying the computer program codes on the biped robot, a recording medium, a computer memory, a read-only memory (ROM), a random access memory (RAM), electric carrier signals, telecommunication signals and software distribution media. For example, a USB flash drive, a portable hard disk, a magnetic disk, an optical disk.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative modules/units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different mangers for each particular application, while such implementation should not be considered as beyond the scope of the present disclosure.

In the embodiments provided by the present disclosure, it should be understood that the disclosed apparatus (or device) and method may be implemented in other manners. For example, the above-mentioned apparatus embodiment is merely exemplary. For example, the division of modules or units is merely a logical functional division, and other division manner may be used in actual implementations, that is, multiple modules or components may be combined or be integrated into another system, or some of the features may be ignored or not performed. In addition, the shown or discussed mutual coupling may be direct coupling or communication connection, and may also be indirect coupling or communication connection through some interfaces, devices or modules, and may also be electrical, mechanical or other forms.

The modules/units described as separate components may or may not be physically separated. The components represented as modules/units may or may not be physical modules/units, that is, may be located in one place or be distributed to multiple network modules/units. Some or all of the modules/units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for a biped robot, comprising:
   providing the biped robot comprising: a processor, motion parts, a human-computer interaction device and a network access device, wherein the processor electrically coupled to the motion parts, the human-computer interaction device and the network access device;
   obtaining, through the human-computer interaction device, a movement control command inputted by a user, or receiving, through the network access device, the movement control command from a user terminal;
   in response to the movement control command, obtaining, through the processor, an initial distance between a centroid of a double inverted pendulum model of the biped robot and a support point of the biped robot in a lateral movement direction of the biped robot, an initial moving speed of the centroid and an initial displacement of the centroid;
   calculating, through the processor, a measured value of a stable point of the double inverted pendulum model based on the initial distance and the initial moving speed;
   calculating, through the processor, a control output quantity based on the initial moving speed and the measured value of the stable point;
   calculating, through the processor, a desired displacement of the centroid of the double-inverted pendulum model based on the initial moving speed, the initial displacement, and the control output quantity; and
   controlling, through the processor, the motion parts to drive the biped robot to move laterally according to the desired displacement;
   wherein the calculating, through the processor, the measured value of the stable point of the double inverted pendulum model based on the initial distance and the initial moving speed comprises:
   calculating, through the processor, the measured value of the stable point of the double-inverted pendulum model based on the initial distance, the initial moving speed, a natural frequency of the double-inverted pendulum model, and an expected value of the stable point of the double-inverted pendulum model; and
   wherein the measured value of the stable point of the double-inverted pendulum model is calculated using equations of:

$$\rho_m = \begin{cases} x_l + \frac{|\dot{x}_l|}{w} + \rho_d, \text{during left leg supporting} \\ x_r + \frac{|\dot{x}_r|}{w} + \rho_d, \text{during right leg supporting} \end{cases};$$

where, $\rho_m$ represents the measured value of the stable point, $x_l$ represents an initial distance between a centroid of a left leg of the double-inversion model and the support point, $\dot{x}_l$ represents a moving speed of the centroid of the left leg of the double inverted pendulum, $x_r$ represents an initial distance between a centroid of a right leg of the double inverted model and the support point, $\dot{x}_r$ represents a moving speed of the centroid of the right leg of the double inverted model, w represents the natural frequency of the double inverted pendulum model, each of $\dot{x}_l$ and $\dot{x}_r$ is the initial moving speed, and $\rho_d$ represents the expected value of the stable point.

2. The method of claim 1, wherein the calculating, through the processor, the control output quantity based on the initial moving speed and the measured value of the stable point comprises:
   calculating, through the processor, the control output quantity based on a control proportional coefficient, an expected value of the stable point, the measured value of the stable point, a control differential coefficient and the initial moving speed.

3. The method of claim 2, wherein the control output quantity is calculated using equations of:

$$a = k_p(\rho_d - \rho_m) + k_d(0 - v); \text{ and}$$

$$v = v_0 + a*t;$$

where, a represents the control output quantity, $k_p$ represents the control proportional coefficient, $\rho_d$ represents the expected value of the stable point, $\rho_m$ represents the measured value of the stable point, $k_d$ represents the control differential coefficient, v represents a desired value of the moving speed of the centroid of the double inverted pendulum, $v_0$ represents the initial moving speed, and t represents the time constant.

4. The method of claim 1, wherein the desired displacement of the centroid of the double-inverted pendulum model is calculated using equations of:

$$p = p_0 + v*t + 0.5*t^2; \text{ and}$$

$$v = v_0 + a*t;$$

where, p represents the desired displacement, $p_0$ represents the initial displacement, v represents a desired value of the moving speed of the centroid of the double inverted model, $v_0$ represents the initial moving speed, t represents the time constant, and a represents the control output quantity.

5. The method of claim 1, wherein the controlling, through the processor, the motion parts to drive the biped robot to move laterally according to the desired displacement comprises:
   obtaining, through the processor, one or more joint angles of the biped robot based on the desired displacement and a lateral movement trajectory of the biped robot; and
   controlling, through the processor, the motion parts to drive the biped robot to move laterally based on the one or more joint angles.

6. A biped robot comprising:
a processor;
motion parts coupled to the processor;
a human-computer interaction device coupled to the processor;
a network access device coupled to the processor;
a memory coupled to the processor; and
one or more computer programs stored in the memory and executable on the processor;
wherein, the one or more computer programs comprise:
instructions for, obtaining, through the human-computer interaction device, a movement control command inputted by a user, or receiving, through the network access device, the movement control command from a user terminal;
instructions for, in response to the movement control command, obtaining an initial distance between a centroid of a double inverted pendulum model of the biped robot and a support point of the biped robot in a lateral movement direction of the biped robot, an initial moving speed of the centroid and an initial displacement of the centroid;
instructions for calculating a measured value of a stable point of the double inverted pendulum model based on the initial distance and the initial moving speed;
instructions for calculating a control output quantity based on the initial moving speed and the measured value of the stable point;
instructions for calculating a desired displacement of the centroid of the double-inverted pendulum model based on the initial moving speed, the initial displacement, and the control output quantity; and
instructions for controlling the motion parts to drive the biped robot to move laterally according to the desired displacement;
wherein the instructions for calculating the control output quantity based on the initial moving speed and the measured value of the stable point comprise:
instructions for calculating the control output quantity based on a control proportional coefficient, an expected value of the stable point, the measured value of the stable point, a control differential coefficient and the initial moving speed; and
wherein the control output quantity is calculated using equations of:

$$a = k_p(\rho_d - \rho_m) + k_d(0 - v); \text{ and}$$

$$v = v_0 + a*t;$$

where, a represents the control output quantity, kp represents the control proportional coefficient, $\rho_d$ represents the expected value of the stable point, $\rho_m$ represents the measured value of the stable point, $k_d$ represents the control differential coefficient, v represents a desired value of the moving speed of the centroid of the double inverted pendulum, $v_0$ represents the initial moving speed, and t represents the time constant.

7. The biped robot of claim 6, wherein the instructions for calculating the measured value of the stable point of the double inverted pendulum model based on the initial distance and the initial moving speed comprise:
instructions for calculating the measured value of the stable point of the double-inverted pendulum model based on the initial distance, the initial moving speed, a natural frequency of the double-inverted pendulum model, and an expected value of the stable point of the double-inverted pendulum model.

8. The biped robot of claim 7, wherein the measured value of the stable point of the double-inverted pendulum model is calculated using equations of:

$$\rho_m = \begin{cases} x_l + \dfrac{|\dot{x}_l|}{w} + \rho_d, \text{ during left leg supporting} \\ x_r + \dfrac{|\dot{x}_r|}{w} + \rho_d, \text{ during right leg supporting} \end{cases} ;$$

where, $\rho_m$ represents the measured value of the stable point, $x_l$ represents an initial distance between a centroid of a left leg of the double-inversion model and the support point, $\dot{x}_l$ represents a moving speed of the centroid of the left leg of the double inverted pendulum, $x_r$ represents an initial distance between a centroid of a right leg of the double inverted model and the support point, $\dot{x}_r$ represents a moving speed of the centroid of the right leg of the double inverted model, w represents the natural frequency of the double inverted pendulum model, each of $\dot{x}_l$ and $\dot{x}_r$ is the initial moving speed, and pa represents the expected value of the stable point.

9. The biped robot of claim 6, wherein the desired displacement of the centroid of the double-inverted pendulum model is calculated using equations of:

$$p = p_0 + v*t + 0.5*t^2; \text{ and}$$

$$v = v_0 + a*t;$$

where, p represents the desired displacement, $p_0$ represents the initial displacement, v represents a desired value of the moving speed of the centroid of the double inverted model, $v_0$ represents the initial moving speed, t represents the time constant, and a represents the control output quantity.

10. The biped robot of claim 6, wherein the instructions for controlling the motion parts to drive the biped robot to move laterally according to the desired displacement comprise:
instructions for obtaining one or more joint angles of the biped robot based on the desired displacement and a lateral movement trajectory of the biped robot; and
instructions for controlling the motion parts to drive the biped robot to move laterally based on the one or more joint angles.

11. A non-transitory computer readable storage medium for storing one or more computer programs executable on the processor, wherein the one or more computer programs comprise:
instructions for, obtaining, through the human-computer interaction device of a biped robot, a movement control command inputted by a user, or receiving, through the network access device of the biped robot, the movement control command from a user terminal;
instructions for, in response to the movement control command, obtaining an initial distance between a centroid of a double inverted pendulum model of the biped robot and a support point of the biped robot, an initial moving speed of the centroid and an initial displacement of the centroid;
instructions for calculating a measured value of a stable point of the double inverted pendulum model based on the initial distance and the initial moving speed;
instructions for calculating a control output quantity based on the initial moving speed and the measured value of the stable point;

instructions for calculating a desired displacement of the centroid of the double-inverted pendulum model based on the initial moving speed, the initial displacement, and the control output quantity; and instructions for controlling the motion parts of the biped robot to drive the biped robot to move laterally according to the desired displacement;

wherein the desired displacement of the centroid of the double-inverted pendulum model is calculated using equations of:

$$p=p_0+v*t+0.5*t^2; \text{ and}$$

$$v=v_0+a*t;$$

where, p represents the desired displacement, $p_0$ represents the initial displacement, v represents a desired value of the moving speed of the centroid of the double inverted model, $v_0$ represents the initial moving speed, t represents the time constant, and a represents the control output quantity.

12. The storage medium of claim 11, wherein the instructions for calculating the measured value of the stable point of the double inverted pendulum model based on the initial distance and the initial moving speed comprise:

instructions for calculating the measured value of the stable point of the double-inverted pendulum model based on the initial distance, the initial moving speed, a natural frequency of the double-inverted pendulum model, and an expected value of the stable point of the double-inverted pendulum model.

13. The storage medium of claim 12, wherein the measured value of the stable point of the double-inverted pendulum model is calculated using equations of:

$$\rho_m = \begin{cases} x_l + \dfrac{|\dot{x}_l|}{w} + \rho_d, & \text{during left leg supporting} \\ x_r + \dfrac{|\dot{x}_r|}{w} + \rho_d, & \text{during right leg supporting} \end{cases};$$

where, $\rho_m$ represents the measured value of the stable point, $x_l$ represents an initial distance between a centroid of a left leg of the double-inversion model and the support point, $\dot{x}_l$ represents a moving speed of the centroid of the left leg of the double inverted pendulum, $x_r$ represents an initial distance between a centroid of a right leg of the double inverted model and the support point, $\dot{x}_r$ represents a moving speed of the centroid of the right leg of the double inverted model, w represents the natural frequency of the double inverted pendulum model, each of $\dot{x}_l$ and $\dot{x}_r$ is the initial moving speed, and pa represents the expected value of the stable point.

14. The storage medium of claim 11, wherein the instructions for calculating the control output quantity based on the initial moving speed and the measured value of the stable point comprise:

instructions for calculating the control output quantity based on a control proportional coefficient, an expected value of the stable point, the measured value of the stable point, a control differential coefficient and the initial moving speed.

15. The storage medium of claim 14, wherein the control output quantity is calculated using equations of:

$$a=k_p(\rho_d-\rho_m)+k_d(0-v); \text{ and}$$

$$v=v_0+a*t;$$

where, a represents the control output quantity, $k_p$ represents the control proportional coefficient, $\rho_d$ represents the expected value of the stable point, $\rho_m$ represents the measured value of the stable point, $k_d$ represents the control differential coefficient, v represents a desired value of the moving speed of the centroid of the double inverted pendulum, $v_0$ represents the initial moving speed, and t represents the time constant.

16. The storage medium of claim 11, wherein the instructions for controlling the motion parts to drive the biped robot to move laterally according to the desired displacement comprise:

instructions for obtaining one or more joint angles of the biped robot based on the desired displacement and a lateral movement trajectory of the biped robot; and instructions for controlling the motion parts to drive the biped robot to move laterally based on the one or more joint angles.

* * * * *